(12) United States Patent
Sumino et al.

(10) Patent No.: US 7,425,267 B2
(45) Date of Patent: Sep. 16, 2008

(54) METHOD AND EQUIPMENT FOR TREATING MICROCYSTIN-CONTAINING WATER

(75) Inventors: Tatsuo Sumino, Chiyoda-ku (JP); Takako Ogasawara, Chiyoda-ku (JP); Ho-Dong Park, Matsumoto (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 318 days.

(21) Appl. No.: 11/270,745

(22) Filed: Nov. 10, 2005

(65) Prior Publication Data

US 2006/0096915 A1    May 11, 2006

(30) Foreign Application Priority Data

Nov. 11, 2004   (JP)   ............... 2004-327799

(51) Int. Cl.
C02F 3/34    (2006.01)
C02F 3/06    (2006.01)

(52) U.S. Cl. .................. 210/601; 210/615; 435/262.5

(58) Field of Classification Search .................. 210/601, 210/615, 620, 629, 150, 151, 252, 259, 911; 435/262, 262.5
See application file for complete search history.

(56) References Cited

U.S. PATENT DOCUMENTS 5,595,893 A    1/1997   Pometto, III et al.

FOREIGN PATENT DOCUMENTS

| | | | |
|---|---|---|---|
| EP | 0 839 765 A2 | 5/1998 | |
| JP | A 08-033888 | 2/1996 | |
| JP | A 09-239370 | 9/1997 | |
| JP | A 11-070395 | 3/1999 | |
| JP | P2001-129580 | * | 5/2001 |
| JP | P2004-81926 | * | 3/2004 |

OTHER PUBLICATIONS

Kenichi Harada, Recent Advances of Toxic Cyanobacteria Researches [in Japanese], Journal Of Health Science, Pharmaceutical Society of Japan, 45(3), 150-165, 1999.
M. Watanabe, "Water-bloom," *University of Tokyo Press*, 3.2-3.4, pp. 56-68, 1999.
Ishii et al., "Characterization of degradation process of cyanobacterial hepatotoxins by gram-negative aerobic bacterium," *Water Research*, vol 38, No. 11, pp. 2667-2676, 2004.
Park et al., "Degradation of the cyanobacterial hepatotoxin microcystin by a new bacterium isolated from a hypertrophic lake," *Environmental Toxicology*, vol. 16, No. 4, pp. 337-343, 2001.
Saito et al., "Detection and sequencing of the microcystin lr-degrading gene, *mlrA*, from new bacteria isolated from Japanese lakes," *FEMS Microbiology Letters*, vol. 229, No. 2, pp. 271-276, 2003.

* cited by examiner

*Primary Examiner*—Fred G. Prince
(74) *Attorney, Agent, or Firm*—Oliff & Berridge, PLC (57) ABSTRACT

The method for treating microcystin-containing water which detoxifies microcystin in the microcystin-containing water, the method comprises the step of: bringing the microcystin-containing water into contact with a *Sphingomonas* bacterium to degrade biologically the microcystin in the microcystin-containing water, wherein: the *Sphingomonas* bacterium is a strain FERM P-19480 which is deposited as strain MDB1 with International Patent Organism Depositary, National Institute of Advanced Industrial Science and Technology.

9 Claims, 6 Drawing Sheets

METHOD AND EQUIPMENT FOR TREATING MICROCYSTIN-CONTAINING WATER

BACKGROUND OF THE INVENTION

1. Field of the Invention

The present invention relates to a method and an equipment for treating microcystin-containing water, more particularly to a method and an equipment for treating microcystin-containing water that can degrade and detoxify microcystin produced from algae such as water-bloom generated in closed-water areas such as lakes, dams, moats, and inland seas.

2. Description of the Related Art

When closed-water areas such as lakes, dams, moats, and inland seas are eutrophicated due to inflow of sewage or the like, a large amount of cyanobacteria, for example, cyanobacteria belonging to the genus *Microcystis* are proliferated in the closed-water areas to generate so-called water-bloom. Many types of the cyanobacteria including the generated water-bloom produce microcystin called water-bloom toxin, and thus the closed-water areas are polluted with microcystin. Microcystin is composed of a cyclic peptide consisting of seven amino acids, and has properties of toxic and carcinogenic to a liver of human or livestock.

Microcystin LR, microcystin RR, and microcystin YR detected as typical microcystins from closed-water areas make human or livestock poisoned when the microcystins are orally ingested. There are various reports on poisoning by the microcystins in Japan and other countries, irrespective of human or livestock (see Mariyo WATANABE, "Water-bloom", University of Tokyo Press, 1999, and Kenichi HARADA, "Recent Advances of Toxic Cyanobacteria Researches", Journal of Health Science, 45(3), 150-165, 1999). However, since the mechanism of liver diseases due to the microcystins has not been clear, there is no method for treating the poisoning actually.

Conventionally, various methods for treating microcystin have been studied. In order to prevent poisoning by microcystin, a method for suppressing the generation of water-bloom is generally used.

As the method for suppressing the generation of water-bloom, a method is adopted to add an algae proliferation inhibitor such as lysine to a closed-water area with generated water-bloom. In addition, a method is also adopted to spray an algaecidal copper ion compound over a closed-water area with generated water-bloom, as described in Japanese Patent Application Publication No. 9-239370.

In Japanese Patent Application Publication No. 8-33888, a method is also suggested to transmit ultrasonic waves to polluted water prepared by evacuating a part of a closed-water area with water-bloom generated, thereby crushing cells of water-bloom so as to destroy the algae.

However, the produced microcystin is accumulated in the cells of the cyanobacteria. Even if the water-bloom is removed by the above-described methods, a large amount of microcystin is released from the crushed cyanobacteria. Therefore, there is a problem that the closed-water area is increasingly polluted with microcystin.

In order to resolve this problem, Japanese Patent Application Publication No. 11-70395 discloses a method of oxidation degradation with ozone, and a method of oxidation with chlorine, as a method for treating microcystin produced from water-bloom.

However, in the method of adding an algae proliferation inhibitor, since the algae proliferation inhibitor itself is an organic substance such as lysine, then BOD concentration in a closed-water area is increased by the addition of the algae proliferation inhibitor, which causes organic substance pollution.

In the method described in Japanese Patent Application Publication No. 9-239370, since a large amount of copper ion compounds remains in water in a closed-water area, it is not preferable that the water is used to be drunk.

The method described in Japanese Patent Application Publication No. 8-33888 has drawbacks in that oscillation of ultrasonic waves requires a massive amount of energy, and the residual crushed cells cause secondary pollution such as eutrophication.

In the method described in Japanese Patent Application Publication No. 11-70395, and the method of oxidation with chlorine, it is possible to completely degrade microcystin itself in a closed-water area. However, in such methods, since ozone or chlorine is reacted with a large amount of contaminants in a closed-water area, there is problem in that microcystin cannot be degraded efficiently. In addition, there is also a problem that a toxic by-product such as trihalomethane is generated due to the strong oxidation ability of ozone or chlorine.

SUMMARY OF THE INVENTION

The present invention has been contrived in view of such circumstances, and an object thereof is to provide a method and an equipment for treating microcystin-containing water that can carry out biological treatment of extremely rapidly, and easily degradation and detoxification of microcystin which is contained in a closed-water area with generated water-bloom, without affecting the environment and ecosystem in the closed-water area.

In order to attain the aforementioned object, the present invention is directed to the method for treating microcystin-containing water which detoxifies microcystin in the microcystin-containing water, the method comprising the step of: bringing the microcystin-containing water into contact with *Sphingomonas* bacterium to degrade biologically the microcystin in the microcystin-containing water, wherein: the *Sphingomonas* bacterium is a strain FERM P-19480 which is deposited as strain MDB1 with International Patent Organism Depositary, National Institute of Advanced Industrial Science and Technology.

According to the present invention, *Sphingomonas* bacterium which makes contact with microcystin-containing water has a resolution of microcystin. Therefore, since microcystin in microcystin-containing water can be degraded biologically and detoxified, it is possible to prevent production of a by-product or presence of a harmful substance remaining in the treated water by the treatment.

Furthermore, since *Sphingomonas* bacterium can be naturally proliferated by degradation of microcystin, it is possible to reduce the running cost required for treatment considerably as compared with a conventional treatment method.

In particular, the strain FERM P-19480 was deposited under Accession No. FERM BP-10448 with International Patent Organism Depositary, National Institute of Advanced Industrial Science and Technology (referred to as AIST, that address is AIST Tsukuba Central, 6, 1-1, Higashi 1-chome, Tsukuba-shi, Ibaraki-ken 305-8566, JAPAN) as the strain MDB1 on Nov. 9, 2005. The strain FERM P-19480 belonging to the genus *Sphingomonas* described above can degrade microcystin extremely faster than conventional bacterium for degradation microcystin while being able to be proliferated in an easy and stable manner at room temperature. Consequently, by use of this strain FERM P-19480 as a member of Sphingomonas bacterium, microcystin-containing water can be detoxified extremely rapidly without requiring much labor for the treatment, and thus efficient treatment of microcystin-containing water can be provided in accordance with various circumstances.

Preferably, the *Sphingomonas* bacterium is sprayed over a water surface of a closed-water area so as to make contact with the microcystin-containing water, the closed-water area being a source of the microcystin-containing water. Herein, the term "closed-water area" includes a partially or wholly closed-water area such as a lake, dam, moat, and inland sea.

Although *Sphingomonas* bacterium can be efficiently proliferated in the presence of microcystin to be a dominant bacterium, the proliferation ability of *Sphingomonas* bacterium is lowered after microcystin is degraded, so that the dominant bacterium is one of the other microorganisms in microcystin-containing water. Therefore, when *Sphingomonas* bacterium is sprayed over the water surface of microcystin-containing water so as to make contact with the water, it is possible to effectively suppress uneven distribution of *Sphingomonas* bacterium in the microcystin-containing water, so that the time requiring for detoxifying microcystin can be further reduced. In addition, since it is also possible to minimize influence on the environment and ecosystem by spraying even after microcystin is degraded, the time and cost required after the treatment can be considerably reduced.

Preferably, the *Sphingomonas* bacterium is sprayed over the water surface of the closed-water area at a concentration of $10^8$ cells/m$^2$ or higher. By spraying *Sphingomonas* bacterium at this concentration, it is possible to prevent the sprayed *Sphingomonas* bacterium from being predated by other organisms in a closed-water area, and to prevent degradation of microcystin by *Sphingomonas* bacterium from being inhibited. This rapidly allows *Sphingomonas* bacterium to be a dominant bacterium in a closed-water area, and thus the time required for detoxifying microcystin in a closed-water area can be minimized.

The present invention is also directed to the method for treating microcystin-containing water wherein: the *Sphingomonas* bacterium is immobilized so as to make contact with the microcystin-containing water. Preferably, the *Sphingomonas* bacterium is immobilized by being attached to an immobilizing material. Preferably, the *Sphingomonas* bacterium is immobilized by being entrapped in an immobilizing material.

Therefore, since *Sphingomonas* bacterium can evenly make contact with microcystin-containing water by making the bacterium immobilized to make contact with the water, it is possible to degrade and detoxify microcystin further efficiently.

In order to attain the aforementioned object, the present invention is directed to a equipment for microcystin-containing water which detoxifies microcystin containing in the microcystin-containing water, the equipment comprising: an introduction section which introduces the microcystin-containing water; a treatment section which degrades biologically the microcystin in the microcystin-containing water introduced from the introduction section by bringing the microcystin-containing water into contact with a plurality of immobilized members which immobilize *Sphingomonas* bacterium; an aeration device which aerates the treatment section; and a discharge section which discharges the water treated in the treatment section, wherein the *Sphingomonas* bacterium is a strain FERM P-19480 which is deposited as a strain MDB1 with International Patent Organism Depositary, National Institute of Advanced Industrial Science and Technology.

According to the present invention, when microcystin-containing water is pumped up from a closed-water area polluted with microcystin by the introduction section, and makes contact with the pellets in the treatment section, microcystin contained in the water is degraded and detoxified by the *Sphingomonas* bacterium immobilized on or in the pellets as the immobilized members. Then, the water treated in the treatment section is fed back to the closed-water area as treated water via a feedback section. Since the strain FERM P-19480 deposited with AIST as the strain MDB1 is used as the *Sphingomonas* bacterium, which is immobilized on or in the pellets provided in the treatment section, it is possible to simplify setting of treatment conditions in the treatment section. In addition, since the *Sphingomonas* bacterium can degrade microcystin at a degradation rate remarkably higher than that of conventional bacteria for degrading microcystin, microcystin can be degraded biologically and detoxified extremely rapidly. Therefore, since microcystin-containing water pumped up from the closed-water area makes contact with *Sphingomonas* bacterium extremely efficiently, it is possible to provide an equipment which minimizes a time required for purification of the closed-water area polluted with microcystin without secondary pollution. In addition, since microcystin-containing water in the treatment section is aerated by the aeration device, the water in the treatment section can be made more flowable so as to improve contact efficiency, and thus it is possible to improve ability of degrading microcystin by supplying air to *Sphingomonas* bacterium as aerobic microorganisms.

The present invention is also directed to the equipment for treating microcystin-containing water further comprising: a culture section which cultures the *Sphingomonas* bacterium and supplies a culture solution of the cultured *Sphingomonas* bacterium to the treatment section at a predetermined interval and in a predetermined amount of cell concentration of the *Sphingomonas* bacterium.

According to the present invention, the *Sphingomonas* bacterium is cultured in a culture section, and then the culture solution obtained by the culture section is supplied to the treatment section at a predetermined interval and in a predetermined amount so that a predetermined amount of cells of *Sphingomonas* bacterium are supplied to the treatment section and are attached to the pellets. Therefore, microcystin can be efficiently treated in a stable manner.

Preferably, the equipment is placed in a closed-water area as a source of the microcystin-containing water. Therefore, since it is not necessary to provide a space for treating microcystin-containing water, it is possible to reduce considerably the energy required for microcystin-containing water which is to be introduced into and discharged from a closed-water area.

As described above, according to the present invention, the strain FERM P-19480 deposited with AIST as the strain MDB1 is particularly used as *Sphingomonas* bacterium to make contact with microcystin-containing water for degrading and detoxifying microcystin. Therefore, while the production of by-product due to the treatment can be prevented without adjusting the treatment environment or the like, it is possible to degrade microcystin at a degradation rate increased as compared with detoxification of microcystin by conventional biological treatment. In addition, it is also possible to detoxify microcystin in microcystin-containing water extremely rapidly and inexpensively, without causing secondary pollution due to the treatment.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

According to the present invention, there are no specific limitations to *Sphingomonas* bacterium used for treating microcystin-containing water. The present invention may also adopt the bacterium belonging to the genus *Sphingomonas* which can degrade and detoxify microcystin. In the present invention, strain FERM P-19480 is used. The strain FERM P-19480 is separated in a nutrient agar medium from the collected lake water with water-bloom proliferated in Lake Suwa, Nagano, and is deposited with International Patent Organism Depositary, National Institute of Advanced Industrial Science and Technology (AIST) as strain MDB1 (hereinafter referred to as strain MDB1).

The deposited strain MDB1 is examined according to morphological characters, cultural characters, and physiological characters. The morphological characters of strain MDB1 are examined by inoculating the strain MDB1 into a medium and cultured at 30° C. for five days, using a light microscope and a transmission electron microscope. A nutrient agar medium (meat extract: 0.5 g/L, peptone: 1 g/L, sodium chloride: 0.5 g/L, agar: 1.0 g/L) or a nutrient broth medium (meat extract: 0.5 g/L, peptone: 1 g/L, sodium chloride: 0.5 g/L) is used as a basal medium.

Consequently, the strain MDB1 is rod shaped, 0.79±0.23 μm in length and 0.49±0.08 μm in width, and is gram-negative bacterium motile by flagella. Typically, the strain MDB1 grows well when cultured in a nutrient agar medium, and forms a round and convex yellow colony. The optimum growth conditions are 30° C. and pH 7.0 in aerobic culture.

In order to examine the chemical taxonomic characters of strain MDB1, the strain MDB1 are determined according to nucleotide sequences of 16SrRNA genes. Herein, the result is shown in a following Table 1.

TABLE 1

SEQUENCE LISTENING

```
<110> APPLICANT NAME: Tateo SUMINO, Takako OGASAWARA, and Ho-Dong PARK
<120> TITLE OF INVENTION: METHOD AND EQUIPMENT FOR TREATING
MICROCYSTIN-CONTAINING WATER
<160> NUMBER OF SEQ ID NOS: 1
<210> SEQ ID NO 1
<211> LENGTH: 1441
<212> TYPE: DNA
<213> ORGANISM: Sphingomonas sp.
<400> SEQUENCE: 1

1 TGGAGAGTTT GATCCTGGCT CAGAACGAAC GCTGGCGGCA TGCCTAACAC ATGCAAGTCG

61 AACGAAGCCT TCGGGCTTAG TGGCGCACGG GTGCGTAACA CGTGGGAATC TGCCCTTAGG

121 TACGGAATAA CAGTTAGAAA TGACTGCTAA TACCGTATGA TGACTCCGGT CCAAAGATTT

181 ATCGCCTAAG GATGAGCCCG CGTCGGATTA GCTAGTTGGT GAGGTAAAGG CTCACCAAGG

241 CGACGATCCG TAGCTGGTCT GAGAGGATGA TCAGCCACAC TGGGACTGAG ACACGGCCCA

301 GACTCCTACG GGAGGCAGCA GTGGGGAATA TTGGACAATG GGCGAAAGCC TGATCCAGCA

361 ATGCCGCGTG AGTGAAGAAG GCCTTAGGGT TGTAAAGCTC TTTTACCCGG GATGATAATG

421 ACAGTACCGG GAGAATAAGC TCCGGCTAAC TCCGTGCCAG CAGCCGCGGT AATACGGAGG

481 GAGCTAGCGT TGTTCGGAAT CACTGGGCGT AAAGCGCACG TAGGCGGCTT TGTAAGTTAG

541 AGGTGAAAGC CCGGGGCTCA ACTCCGGAAC TGCCTTTAAG ACTGCATCGC TTGAATCTGG

601 GAGAGGTAAG TGGAATTCCG AGTGTAGAGG TGAAATTCGT AGATATTCGG AAGAACACCA

661 GTGGCGAAGG CGGCTTACTG GACCAGAATT GACGCTGAGG TGCGAAAGCG TGGGGAGCAA

721 ACAGGATTAG ATACCCTGGT AGTCCACGCC GTAAACGATG AGAACTAGCT GTCAGGGCCT

781 TTTAGGCTTT GGTGGCGCAG CTAACGCATT AAGTTCTCCG CCTGGGGAGT ACGGTCGCAA
```

TABLE 1-continued

SEQUENCE LISTENING

```
 841 GATTAAAACT CAAAGGAATT GACGGGGGCC TGCACAAGCG GTGGAGCATG TGGTTTAATT

901 CGAAGCAACG CGCAGAACCT TACCAGCGTT TGACATCCTG ATCGCGGTTA CCAGAGATGG

961 TTTCCTTCAG TTCGGCTGGA TCAGTGACAG GTGCTGCATG GCTGTCGTCA GCTCGTGTCG

1021 TGAGATGTTG GGTTAAGTCC CGCAACGAGC GCAACCCTCG TCCTTAGTTG CCATCATTCA

1081 GTTGGGCACT CTAAGGAAAC CGCCGGTGAT AAGCCGGAGG AAGGTGGGGA TGACGTCAAG

1141 TCCTCATGGC CCTTACGCGC TGGGCTACAC ACGTGCTACA ATGGCGGTGA CAGTGGGCAG

1201 CAAACCCGCG AGGGTGAGCT AATCTCCAAA AGCCGTCTCA GTTCGGATTG TTCTCTGCAA

1261 CTCGAGAGCA TGAAGGCGGA ATCGCTAGTA ATCGCGGATC AGCATGCCGC GGTGAATACG

1321 TTCCCAGGCC TTGTACACAC CGCCCGTCAC ACCATGGGAG TTGGTTTCAC CCGAAGGCTG

1381 TGCGCTAACC GCAAGGAGGC AGGAGACCAC GGTGGGATCA GCGACTGGGG TGAAGTCGTA

1441 ACAAGGTAGC CGTAGGGGAA CCTGCGGCTG GATCACCTCC TT
```

Figure 1:
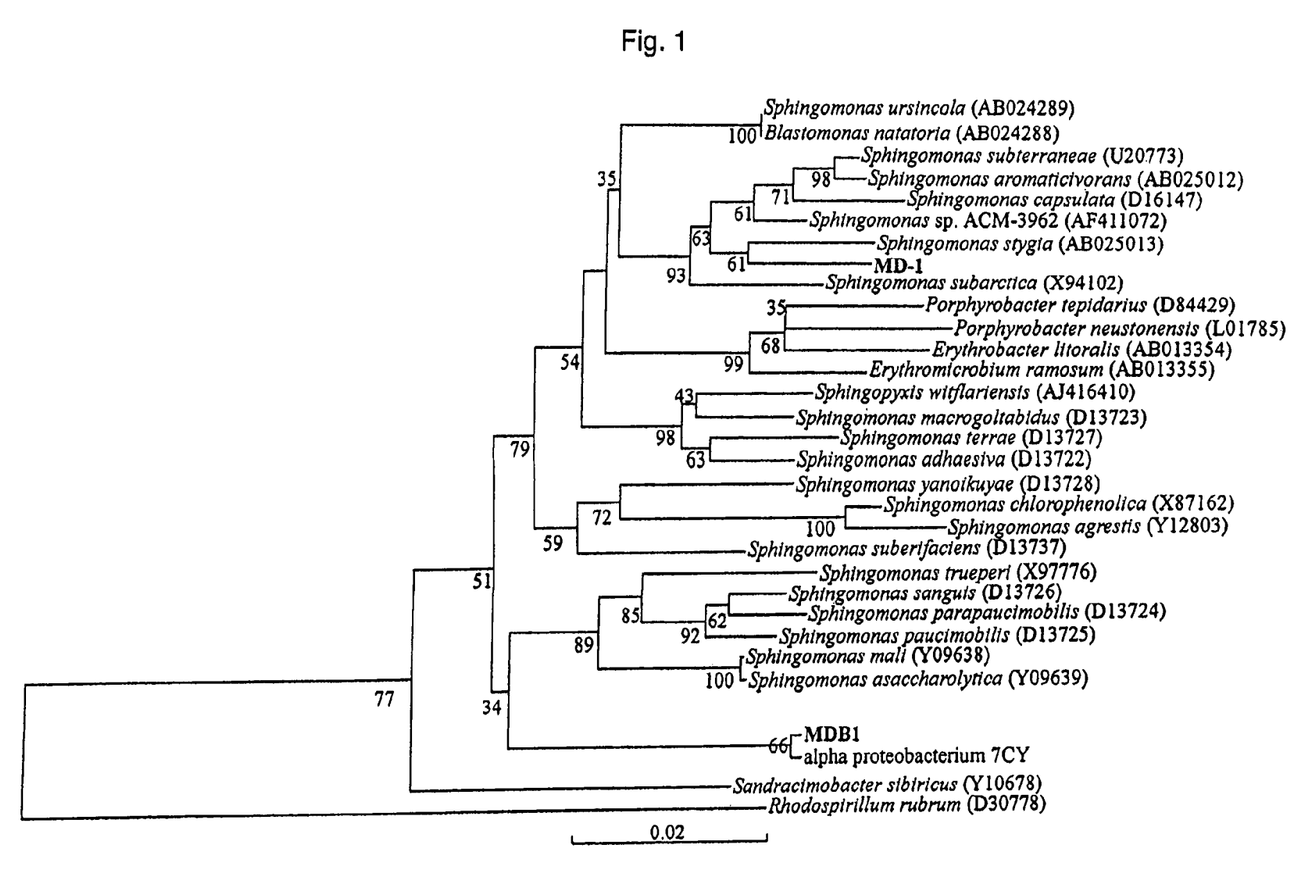
FIG. 1 is a diagram showing a family tree according to nucleotide sequences obtained by analyzing 16SrRNA of strain MDB1.

The above-described nucleotide sequences of strain MDB1 are searched in a homology search system FASTA of National Institute of Genetics. Consequently, it is found that strain MDB1 is a microorganism taxonomically close to the genus *Sphingomonas*, as shown in a family tree of FIG. 1.

Next, the method for culturing the strain MDB1 used in the present invention will be described. As the culture method in the present invention, a conventional method for culturing aerobic bacterium is generally used. Any of synthetic medium and natural medium may be used as a culture medium if the medium appropriately contains a carbon source, a nitrogen source, an inorganic substance, and a necessary proliferation promoting substance which are available for culturing. As the carbon source, saccharides such as glucose, starch, dextrin, mannose, fructose, sucrose, lactose, xylose, arabinose, mannitol, and molasses; organic acids such as acetic acid; alcohols such as glycerol; and the like, may be used alone or in combination. As the nitrogen source, ammonium chloride, ammonium sulfate, sodium nitrate, urea, peptone, meat extract, yeast extract, dry yeast, corn steep liquor, soybean meal, casamino acid, and the like, may be used alone or in combination. In addition, inorganic salts such as sodium chloride, potassium chloride, potassium phosphate, ferrous sulfate, calcium chloride, manganese sulfate, zinc sulfate, and copper sulfate are added as required. Furthermore, a trace component for promoting growth of the strain may be appropriately added. Liquid culture is most suitable for the culture method. The culture temperature is suitably 30° C. The strain can be suitably cultured by adjusting the medium to pH 5 to 10, and preferably pH 7. By inoculating one platinum loop into 150 ml of a nutrient broth medium and carrying out shaking culture at 30° C. and 120 rpm for four days, the medium can be adjusted to a cell concentration of $10^9$ cells/ml.

Figure 2:
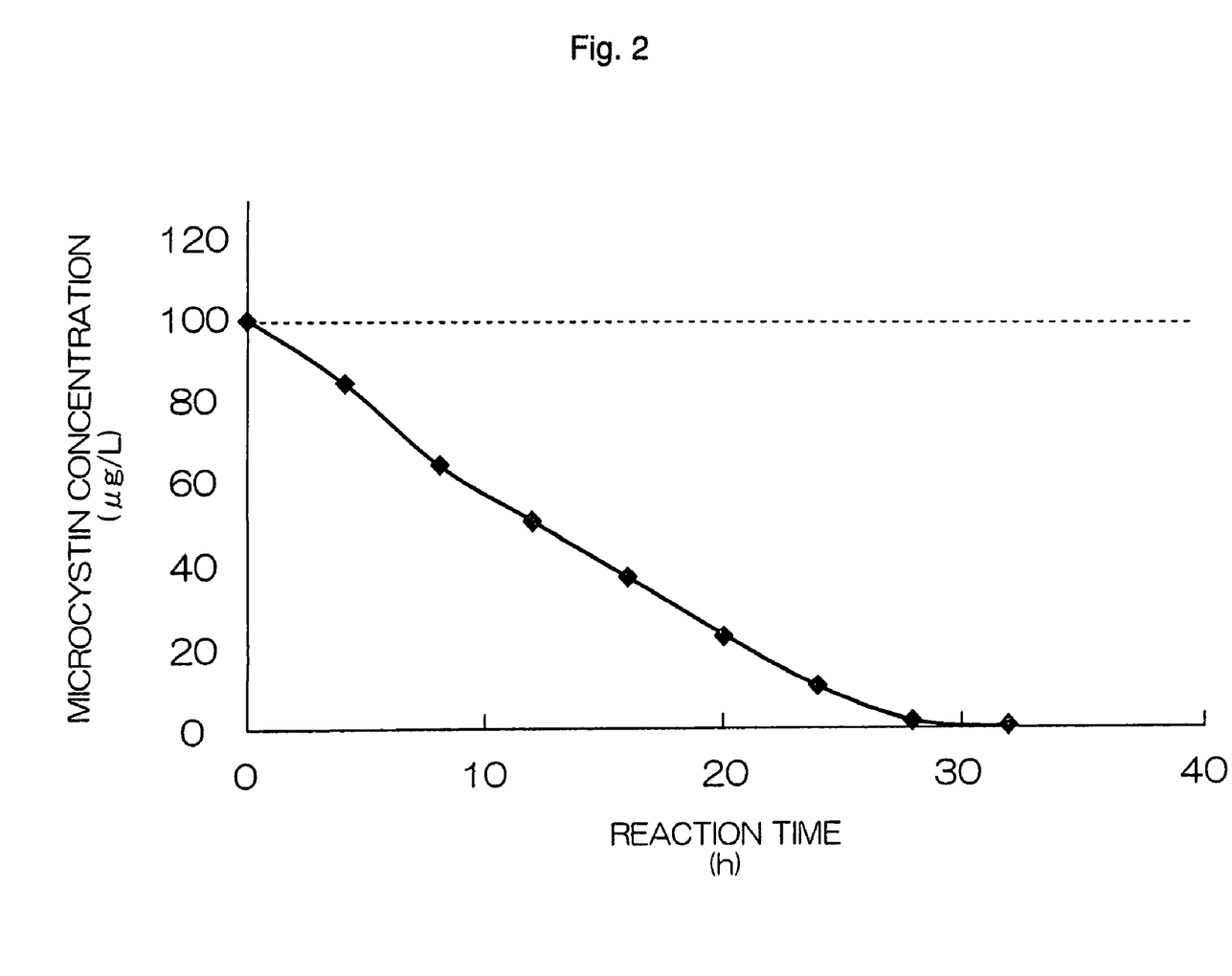
FIG. 2 is a graph showing a microcystin degradation rate of strain MDB1 according to the present invention in microcystin-containing water.

FIG. 2 is a graph showing microcystin degradation rate of strain MDB1 in microcystin-containing water, showing the results of carrying out batch treatment in a state in which the strain MDB1 with a cell concentration of $4 \times 10^8$ cells/ml makes contact with microcystin-containing water. In FIG. 2, a dotted line shows degradation rates in the case of carrying out conventional biological treatment under the same conditions using sludge in a closed-water area with generated water-bloom.

In the graph of FIG. 2, almost no change in the microcystin concentration occurs in relation to time in the conventional treatment, as shown by the dotted line. When the treatment continued (not shown in the graph), the microcystin concentration is finally reduced after two days from the start of treatment, and the water is treated to finally attain a microcystin concentration of 1.0 µg/L or lower after 28 days. On the other hand, in the treatment using strain MDB1 according to the present invention, the microcystin concentration is drastically reduced concurrent with the start of the experiment, the water is degraded at a microcystin concentration of 1.0 µg/L or lower after 30 hours. Consequently, while the conventional biological treatment using the sludge mixed various microorganisms is carried out only in the order of days, microcystin is treated in the order of hours by use of strain MDB1, and therefore, it is found that the time required for treating microcystin can be reduced considerably. In addition, it is confirmed that the strain MDB1 can degrade all three types of microcystin (microcystin LR, microcystin RR, and microcystin YR) which are often detected in lakes or the like. Therefore, the strain MDB1 is a most suitable microorganism for biologically treating microcystin.

In the present invention, a method is also suggested in which the cultured strain MDB1 is sprayed at a predetermined concentration over a closed-water area which contains microcystin due to generation of water-bloom, as a method for bringing strain MDB1 into contact with microcystin-containing water.

Figure 3:
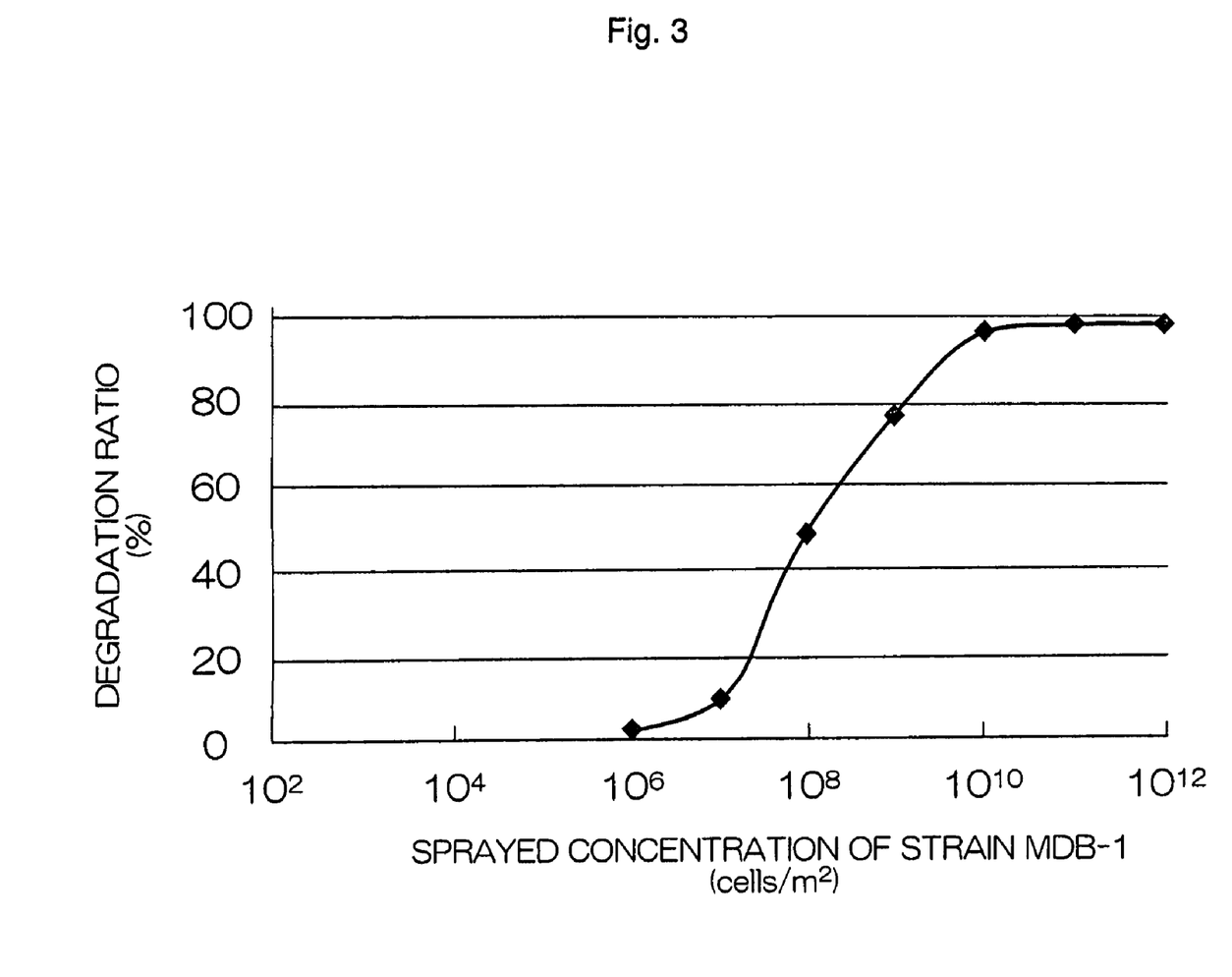
FIG. 3 is a graph showing a relationship between a microcystin degradation ratio and a sprayed cell concentration of strain MDB1 used in the present invention.

FIG. 3 is a graph showing a relationship between a microcystin degradation ratio and a sprayed cell concentration of strain MDB1 used in the present invention.

As shown in the graph of FIG. 3, when strain MDB1 is sprayed at a cell concentration of $10^8$ cells/m² or higher, preferably $10^{10}$ cells/m², then the sprayed strain MDB1 is proliferated in a closed-water area so that microcystin contained in the water can be efficiently degraded. On the other hand, when the strain MDB1 is sprayed at a cell concentration of $10^8$ cells/m² or lower, the microcystin degradation ratio tends to be extremely reduced. As this reason, it is considered that an organism in a closed-water area over which the strain MDB1 has been sprayed predates the strain MDB1 or inhibits degradation of microcystin.

In the present invention, a method is also suggested that the cultured strain MDB1 is immobilized at a predetermined cell concentration to bring the strain into contact with microcystin-containing water, as another contacting method. As a result of studies on the method for immobilizing strain MDB1, it is found that an attachment immobilization method or an entrapping immobilization method is most suitable treatment for degradation of microcystin.

In a treatment using the attachment immobilization method, a culture solution of strain MDB1 is immobilized on an immobilizing material with many irregularities such as globular pellets, cylindrical pellets, gel pellets, or non-woven cloth pellets. Therefore, since the strain MDB1 can be stably attached to the immobilizing material, it is possible to degrade microcystin at an improved efficiency.

On the other hand, in a treatment using the entrapping immobilization method, first, a culture solution of strain MDB1 is mixed with an immobilizing material such as a monomer or a prepolymer. Next, the mixture is polymerized so that strain MDB1 is entrapped and immobilized in the gel to form pellets. Then, microcystin contained in microcystin-containing water is degraded by bringing the water into contact with the pellets. As the monomer material, it is possible to use acrylamide, methylenebisacrylamide, triacrylformal, or the like. As the prepolymer material, it is preferable to use polyethylene glycol diacrylate, or polyethylene glycol methacrylate, and a derivative thereof may also be used. Entrapping immobilization pellets are preferably shaped into globes, cubes, strings, or non-woven clothes, or the like having many irregularities. Therefore, since the contact area of the strain MDB1 increases, it is possible to improve the microcystin degradation ratio.

Figure 4:
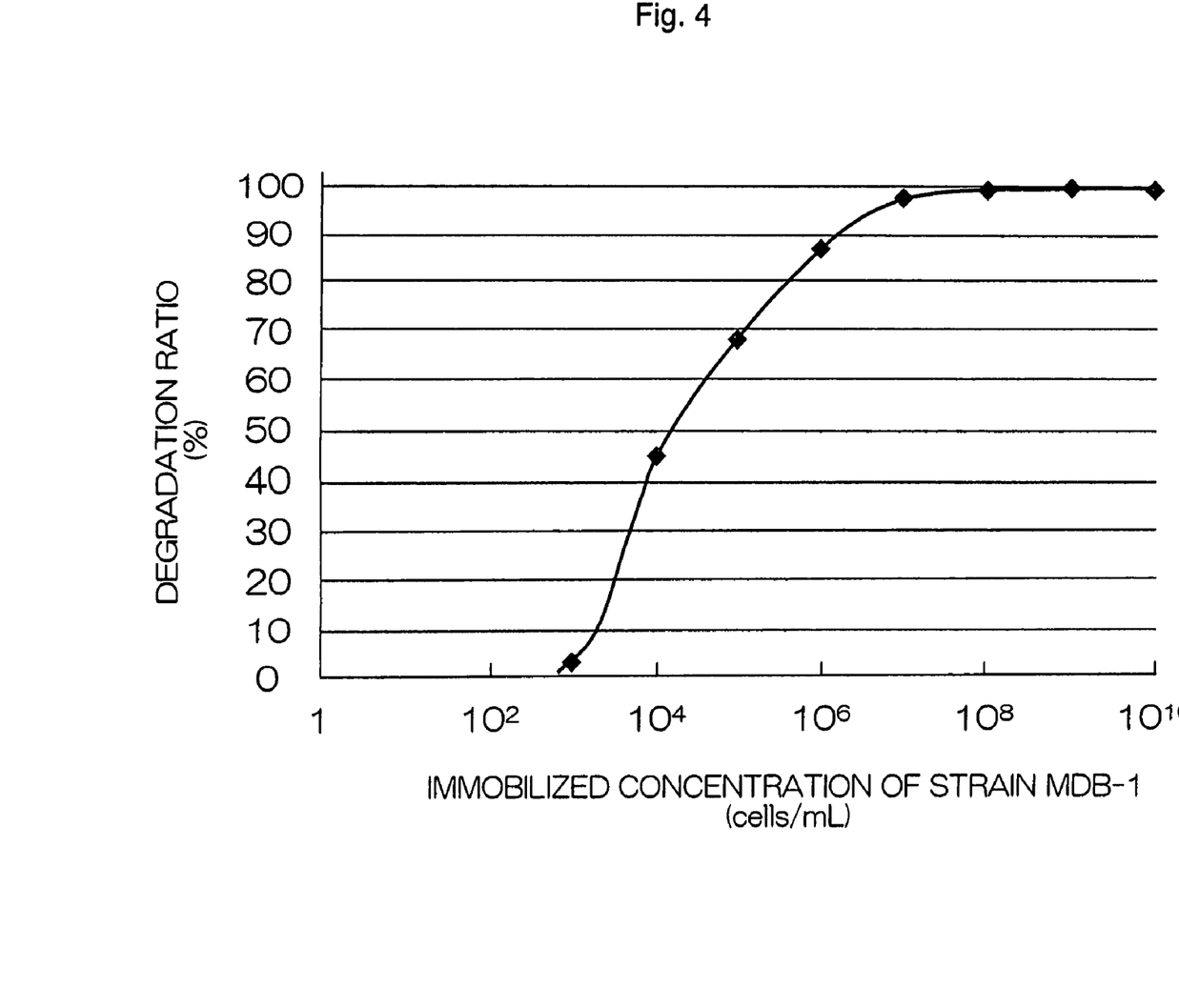
FIG. 4 is a graph showing a relationship between a microcystin degradation ratio and an immobilized cell concentration of strain MDB1 used in the present invention.

FIG. 4 is a graph showing microcystin degradation ratios of strain MDB1 immobilized at each cell concentration.

As shown in the graph of FIG. 4, it is found that microcystin can be treated at a high degradation ratio of 80% or higher when strain MDB1 is immobilized on or in pellets at a cell concentration of $10^6$ cells/ml or higher, and preferably $10^7$ cells/ml or higher.

Table 2 shows microcystin degradation rates in immobilization pellets as results of bringing the pellets on or in which strain MDB1 is immobilized at an initial concentration of $8\times10^8$ cells/ml into contact with microcystin-containing water with a microcystin concentration of 100 µg/L.

TABLE 2

| Type of pellets | Microcystin degradation rate (µg/L-pellets/h) |
|---|---|
| Polyethylene globular attachment pellets | 30 |
| Carbon fiber string-shaped attachment pellets | 80 |
| Plate-shaped non-woven cloth attachment pellets | 60 |
| Acrylamide entrapping pellets | 120 |
| Polyethylene glycol diacrylate entrapping pellets | 180 |

As shown in Table 2, it is found that, though microcystin can be degraded rapidly by both of the attachment immobilization pellets and the entrapping immobilization pellets, and microcystin degradation rate of the two types of entrapping immobilization pellets is particularly faster than that of the three types of attachment immobilization pellets. As the reason, it is considered that an optimum cell concentration can be maintained constantly in the entrapping immobilization pellets.

However, entrapping immobilization pellets have drawbacks in that such pellets require much cost and labor in production thereof, as compared with attachment immobilization pellets. Accordingly, by selecting attachment immobilization or entrapping immobilization according to the application, microcystin-containing water can be efficiently treated.

EXAMPLE 1

Treatment by Spraying Strain MDB1

In an Example 1, the above-described strain MDB1 is cultured in the nutrient broth medium of 2 liter at 30° C. for one week, and a culture solution obtained by culturing the strain MDB1 is centrifuged so as to separate an exclusively bacterial suspension from the medium components. Then, the separated bacterial suspension is adjusted so as to be a cell concentration of $10^8$ cells/m², and is sprayed over 4 m²-wide water surface of an experimental aquarium which is packed with 4 m³ of water having a microcystin concentration of 20 µg/L, so as to carry out an experiment. According to the Example 1, as time passed since the start of the experiment, the microcystin concentration in the microcystin-containing water is reduced. After two weeks, the water can be treated so that a microcystin concentration is equal to or more than 1 µg/L which is defined as a standard by WHO.

As a modification of the Example 1, the above-described bacterial suspension is adjusted so as to be a cell concentration of $10^9$ cells/m², and is sprayed over the 4 m²-wide water surface of an experimental aquarium which is packed with 4 m³ of water containing a microcystin concentration of 18 µg/L once a day, so as to carry out an experiment. In the modification, as time passed since the start of the experiment, the microcystin concentration in the microcystin-containing water is reduced. After five days, the water can be treated so that a microcystin concentration is equal to or more than 1 µg/L which is defined as a standard by WHO.

As described above, since the strain MDB1 aerobically degrades microcystin, then the strain MDB1 can be rapidly allowed to be a dominant bacterium in a closed-water area over having sprayed the strain MDB1 by adjusting the concentration of cells to be sprayed with reference to the water surface area in the above-described manner. Therefore, microcystin contained in the closed-water area can be rapidly degraded.

EXAMPLE 2

Treatment Using Entrapping Immobilization Method of Strain MDB1

Figure 5:
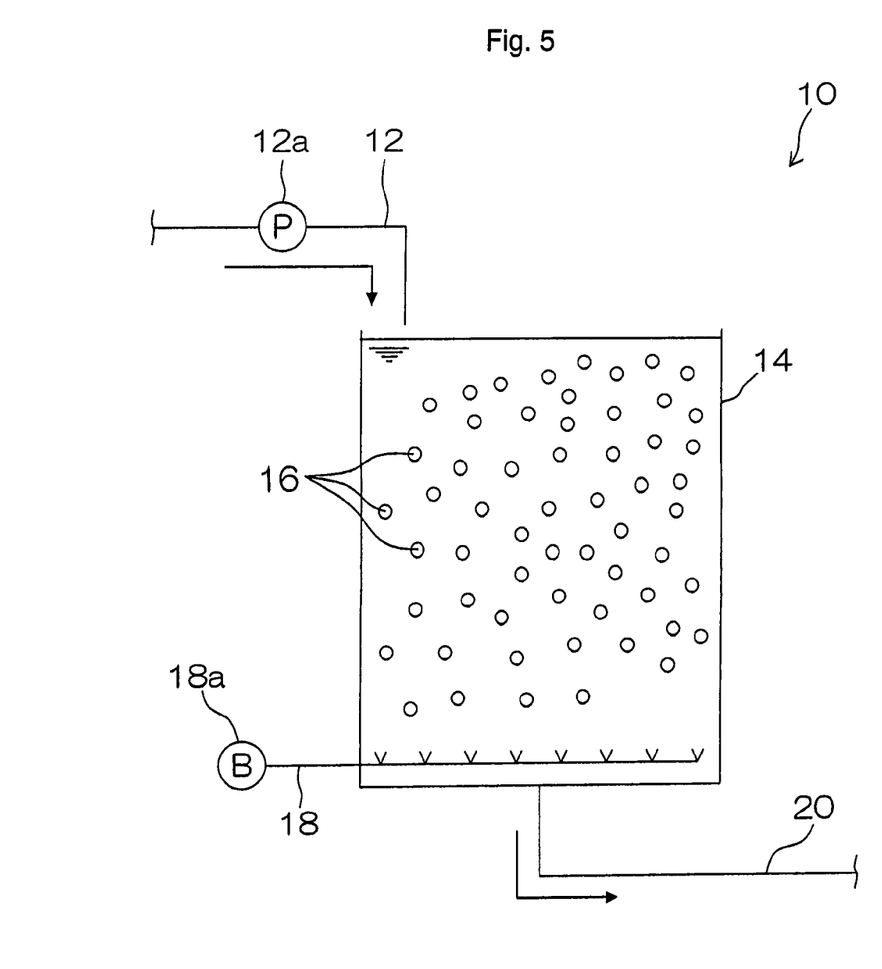
FIG. 5 is a general schematic drawing of a microcystin-containing water treatment equipment according to a first embodiment of the present invention.

In an Example 2, in order to carry out a following experiment, a closed-water area polluted with microcystin is treated using a microcystin-containing water treatment equipment 10 according to a first embodiment of the present invention shown in FIG. 5.

As shown in FIG. 5, in the treatment equipment 10, microcystin-containing water is pumped up from a closed-water area by an introduction pump 12a which is attached to an introduction tube 12 as an introduction section, and the water is supplied to a reaction vessel 14 through the introduction tube 12. A large number of pellets 16 are formed by entrapping and immobilizing the strain MDB1, and are incorporated in the reaction vessel 14 as a treatment section. A diffuser tube 18 as a diffusing device is disposed on the bottom of the reaction vessel 14 so as to diffuse air by driving a blower 18a attached to the diffuser tube 18. Therefore, while the air is supplied to the reaction vessel 14 to promote aerobic treatment of strain MDB1 in the pellets 16, the packed pellets 16 are stirred to increase the contact ratio. The reaction vessel 14 is provided with a discharge tube 20 as a discharge section, and the microcystin-containing water treated in the reaction vessel 14 as treated water is derived from the bottom of the reaction vessel 14 via the discharge tube 20.

As a method for making the pellets 16 used in the water treatment equipment 10, first, the above-described strain MDB1 is aerobically cultured in the nutrient broth medium at 30° C. for four days. Next, cells of the strain MDB1 is separated from the culture solution by centrifugation, and separated cells are adjusted so that the cell concentration of strain MDB1 is $10^9$ cells/cm$^3$. Next, the separated and adjusted bacterial suspension of strain MDB1 is mixed with 10% polyethylene glycol diacrylate, and then 0.25% potassium persulfate is added to the mixture so that the cells of strain MDB1 are entrapped and immobilized by polymerization of the polymer. Then, the pellets 16 are formed in globes with a diameter of 3 mm.

Microcystin-containing water containing microcystin of 10 µg/L is treated in the treatment equipment 10, setting the flow rate so that the microcystin-containing water is retained in the reaction vessel 14 for 30 minutes. Consequently, in the treatment equipment 10, the microcystin-containing water can be continuously treated in a stable manner that a microcystin concentration is 1 µg/L or lower.

EXAMPLE 3

Treatment Using Attachment Immobilization Method of Strain MDB1

Figure 6:
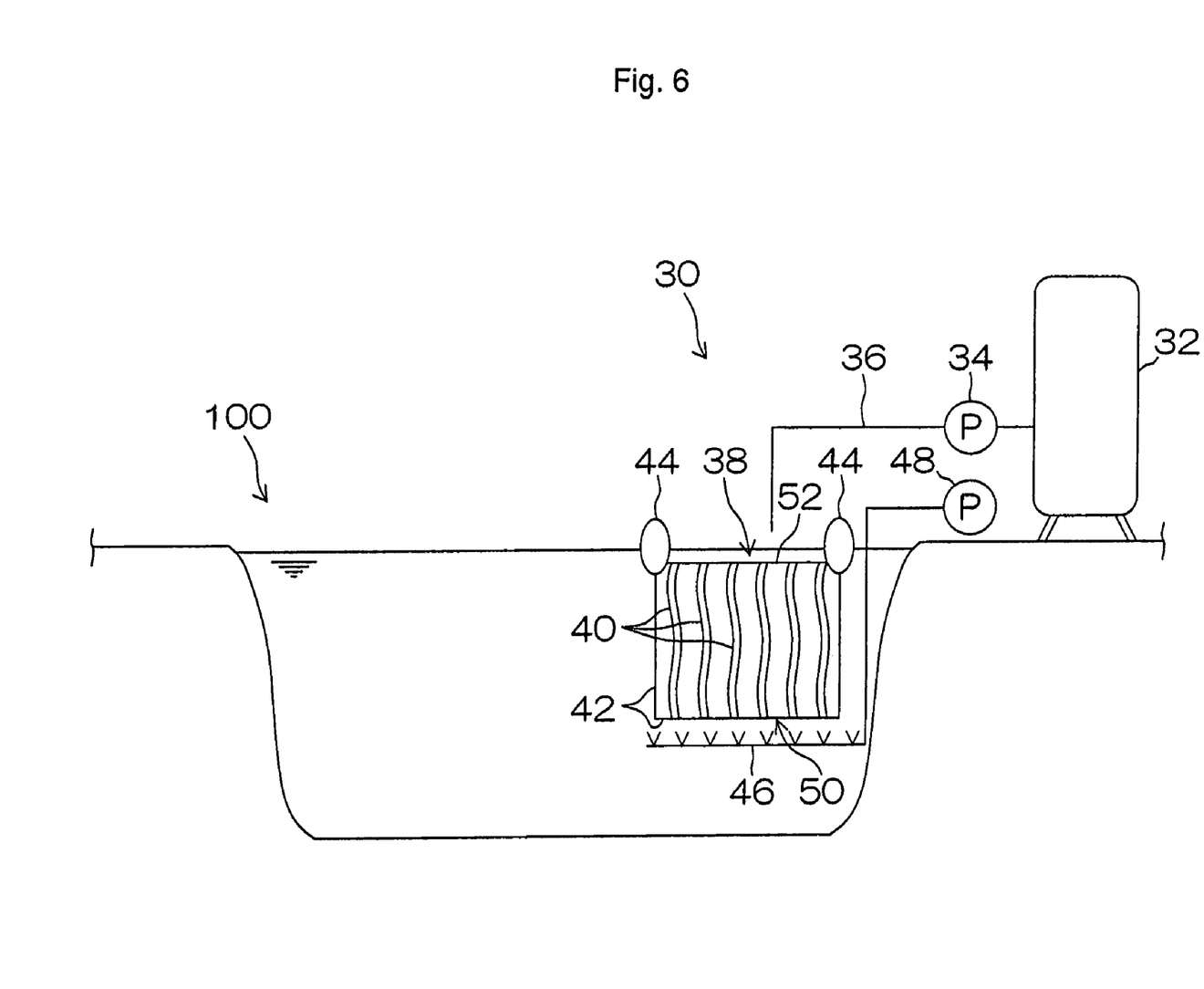
FIG. 6 is a general schematic drawing of an microcystin-containing water treatment equipment according to a second embodiment of the present invention.

In an Example 3, in order to carry out a following experiment, an agricultural pool 100 as a closed-water area containing microcystin is treated using a microcystin-containing water treatment equipment 30 according to a second embodiment of the present invention as shown in FIG. 6.

In the treatment equipment 30, a culture tank 32 is disposed as a culture section and a supply section on one shore of the agricultural pool 100, which cultures the strain MDB1 in the nutrient broth medium stored in the culture tank 32. The cultured bacterial suspension of the strain MDB1 is supplied via a supply tube 36 to a treatment section 38 which is placed in the agricultural pool 100, by driving a supply pump 34 attached to the supply tube 36. The treatment section 38 is provided so that a plurality of net rings 40 are linked and fixed to a linking member 42, and a plurality of floating members 44 are floated on the water surface. Preferably, the net rings 40 are composed of a material that the strain MDB1 supplied from the supply tube 36 can be attached to and immobilize on. A diffuser tube 46 is disposed in the lower part of the treatment section 38, and aerates the attached and immobilized strain MDB1 on the net rings 40 by driving an air pump 48 placed on the one shore of the agricultural pool 100. While an introduction section 50 is formed in the lower part of the treatment section 38, a discharge section 52 is placed in the upper part of the treatment section 38. Accordingly, in the treatment section 38, while water of the agricultural pool 100 is flowed into the introduction section 50, the water in which microcystin has been degraded is discharged as a treated water from the discharge section 52 to the agricultural pool 100.

In order to carry out a following experiment, microcystin-containing water containing microcystin of 40 µg/L in the 1,000 m$^3$-volume agricultural pool 100 is treated using the treatment equipment 30 described above. The culture tank 32 having a volume of 100 liter is used. A bacterial suspension is prepared by culturing the strain MDB1 for one week in the nutrient broth medium filled in the culture tank 32, and is supplied to the treatment section 38 from the supply tube 36 at a flow rate of 10 L/day for 10 days. As a result, at 20 days after the start of the operation, microcystin contained in the agricultural pool 100 can be reduced to a concentration of 1 µg/L or lower.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method for treating microcystin-containing water which detoxifies microcystin in the microcystin-containing water, the method comprising the step of:

bringing the microcystin-containing water into contact with *Sphingomonas* bacterium to degrade biologically the microcystin in the microcystin-containing water, wherein:

the *Sphingomonas* bacterium is a strain MDB1, which is deposited with International Patent Organism Depositary, National Institute of Advanced Industrial Science and Technology, under Accession No. FERM BP-10448.

2. The method for treating microcystin-containing water as defined in claim 1, wherein:

the *Sphingomonas* bacterium is sprayed over a water surface of a closed-water area so as to make contact with the microcystin-containing water, the closed-water area being a source of the microcystin-containing water.

3. The method for treating microcystin-containing water as defined in claim 2, wherein:

the *Sphingomonas* bacterium is sprayed over the water surface of the closed-water area at a concentration of $10^8$ cells/m$^2$ or higher.

4. The method for treating microcystin-containing water as defined in claim 1, wherein:

the *Sphingomonas* bacterium is immobilized so as to make contact with the microcystin-containing water.

5. The method for treating microcystin-containing water as defined in claim 4, wherein:

the *Sphingomonas* bacterium is immobilized by being attached to an immobilizing material.

6. The method for treating microcystin-containing water as defined in claim 4, wherein:

the *Sphingomonas* bacterium is immobilized by being entrapped in an immobilizing material.

7. A method for treating microcystin-containing water which detoxifies microcystin in the microcystin-containing water, the method comprising the steps of:

introducing the microcystin-containing water into a treatment section;

degrading biologically the microcystin in the microcystin-containing water introduced into the treatment section by bringing the microcystin-containing water into contact with a plurality of immobilized members which immobilize *Sphingomonas* bacterium;

aerating the treatment section; and discharging treated water from the treatment section, wherein the *Sphingomonas* bacterium is a strain MDB1, which is deposited with International Patent Organism Depositary, National Institute of Advanced Industrial Science and Technology, under Accession No. FERM BP-10448.

8. The method for treating microcystin-containing water as defined in claim 7, further comprising the steps of:
   culturing the *Sphingomonas* bacterium; and
   supplying a culture solution of the cultured *Sphingomonas* bacterium to the treatment section at a predetermined interval and in a predetermined amount of cell concentration of the *Sphingomonas* bacterium.

9. The method for treating microcystin-containing water as defined in claim 7, wherein:
   the source of the introduced microcystin-containing water is a closed-water area.

* * * * *